Figure 1:
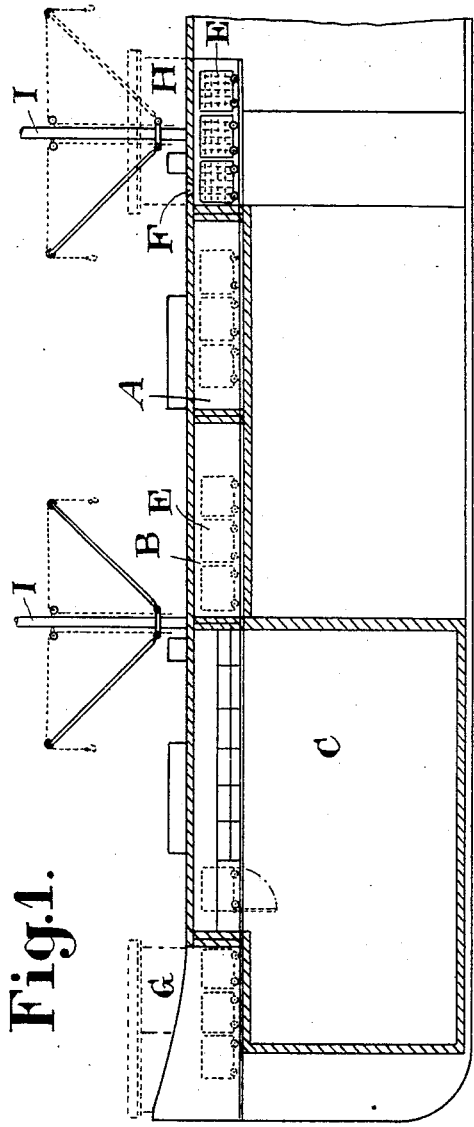

J. ANDVIG.
BLUBBER CARGO SHIP.
APPLICATION FILED JAN. 12, 1916.

1,186,159.

Patented June 6, 1916.
2 SHEETS—SHEET 1.

Inventor
Jens Andvig,
By Henry Potter
Atty.

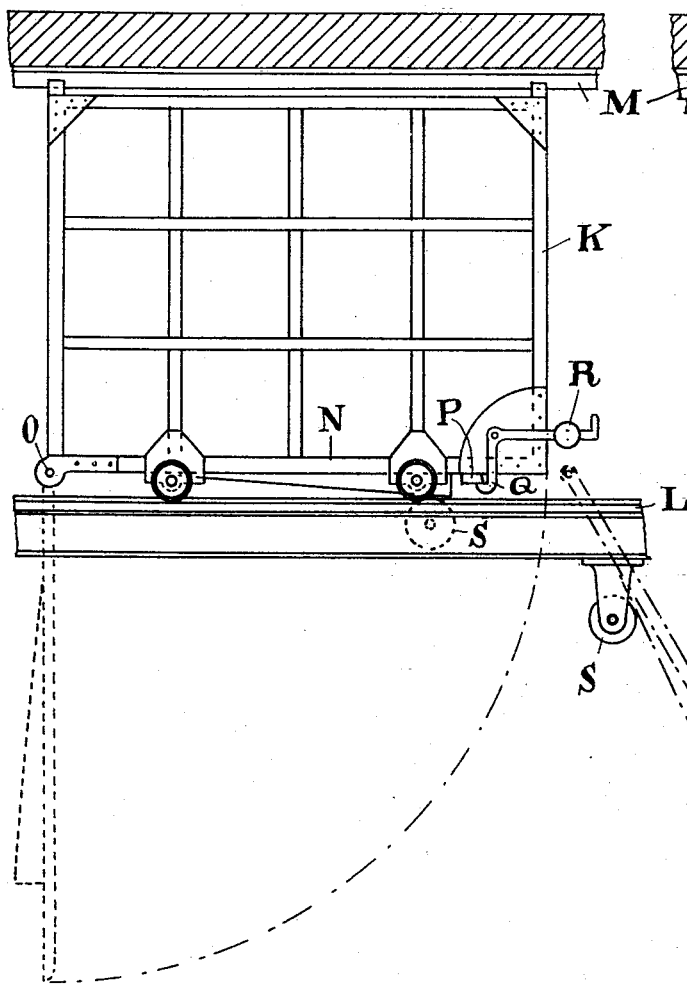
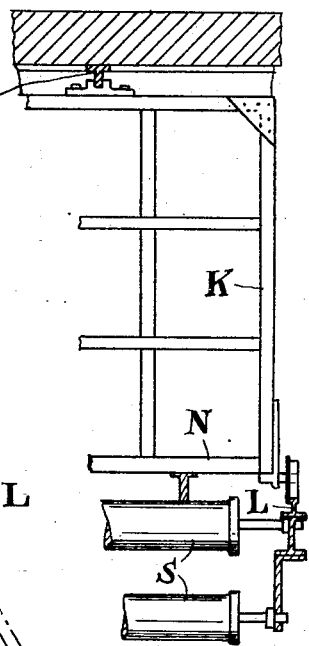

UNITED STATES PATENT OFFICE.

JENS ANDVIG, OF CHRISTIANIA, NORWAY.

BLUBBER-CARGO SHIP.

1,186,159.  Specification of Letters Patent.  Patented June 6, 1916.

Application filed January 12, 1916. Serial No. 71,751.

*To all whom it may concern:*

Be it known that I, JENS ANDVIG, a subject of the King of Norway, residing at Christiania, Norway, have invented certain new and useful Improvements in Blubber-Cargo Ships; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the treatment of whale blubber and has for its object the arrangement of ships for the transportation of whale blubber in a frozen condition.

The whalers have hitherto taken the blubber of whale home in tanks or been obliged to boil it in the whaling premises. With the former method the blubber is liable to putrefaction whereby the oil loses in quality and value. The method of boiling the blubber on the place of capture has therefore been adopted to a progressive extent. This requires however a well sheltered harbor in proximity of the field of capture, where the floating factories may lie in shelter to have the oil boiled and cleared and to utilize the tanks to their full capacity—or where favorable conditions of depth exist close up to the coast for the establishment of chopping slips and quays for the bringing up of the whale, discharging and loading of coal, oil and the other requirements of a land station. These and other circumstances have suggested to the applicant the idea of constructing a ship with a freezing plant capable of preserving the blubber and avoiding its being impaired during the long conveyance and able to perform any work with the blubber even when rolling in heavy sea on the open ocean. The blubber is thereupon taken in frozen condition to a harbor where the costs of the boiling will be minimized relatively to those incurred by boiling on the spot and where the blubber and its byproducts may be better utilized than is the case nowadays. This method will permit whaling without payment of taxes outside of the territorial waters all around the globe and the whale flesh, which relatively to the costs now gives a very little yield of oil, may be converted into a healthy and nutritive food.

The invention has for its object to provide for a freezing plant capable of being suitably combined with a ship so as to allow of freezing and storing the blubber in the most economical manner. For this purpose one or more large and cooled holds in the ship are connected with freezing compartments arranged alongside of the ship and provided with tracks for carriages on which to store the blubber during the freezing process and from which it may be discharged directly into the hold. The blubber will accordingly only get into the hold after being frozen to a rigid condition and in the form of blocks of a suitable size to be handled and stored. In order to perform this work in a convenient and economical manner the freezing compartment is connected with a loading room connected, as well as the other end of the track, with a return track so as to allow the circulation of the trucks.

The invention is illustrated on the annexed drawings in which—

Figure 2:
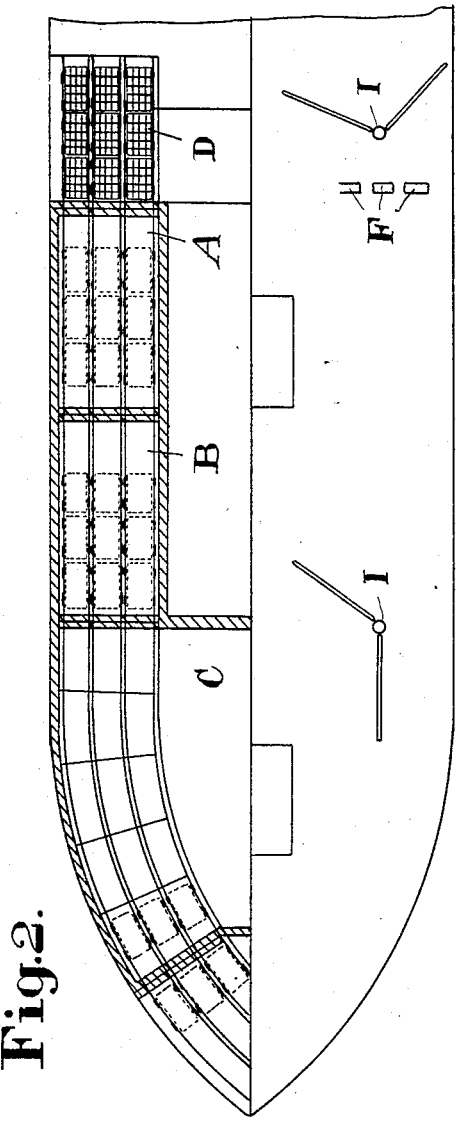

Figure 1 shows a portion of a ship in side view with section of the freezing compartment and hold and Fig. 2 a corresponding plan view partially in section. Figs. 3 and 4 are detail views of the carriages.

In Fig. 2 a portion of the lower deck is shown in plan with the arrangement of three parallel tracks on which the carriages may be conducted from loading hatches in the main deck into the foreroom where the flesh and blubber are deprived of their bloodheat and raw vapors and cooled down to 4—6° C. From here the flesh and blubber are taken through doors into the freezing compartment and cooled down to 3° C. after which the trucks are conducted once more through doors into the store room where the open tracks permit the discharge of the cargo where it is most convenient. The trucks may be taken back the same way or into an elevator room and back over the deck again according to what is most convenient or according to the quantity of the capture. The vessel shown in the drawing is designed to be arranged with four fore rooms, four freezing compartments and four elevator rooms. The compartments through which the trucks pass are fitted out with rails on the deck and a guide rail under the ceiling so as to enable loading and freezing to proceed in heavy sea. On the drawings the fore room is designated by A the freezing compartment with B and the store room with C. In front of the fore room is arranged a hold D in which the trucks E can be loaded through appropriate hatches F in the main deck, the tracks for the carriages being arranged on the between deck. For the purpose of taking the trucks back to the loading compartment after discharging them in the store room an elevator room may be provided as shown at G and H and by means of which the trucks may be lifted up to the main deck and taken back to the loading compartment along the same. Chopping posts with suitable elevator cranes are provided close to the loading hatches F and are designated with I on the drawing.

The construction of the trucks and rail way will be seen from Figs. 3 and 4. The truck E is constructed with an angle iron frame K divided by laths into rectangular compartments. The same is provided with wheels running on a common track L placed on a solid foundation of T-beams. Midway between the two rails of either track is provided on the ceiling a guide rail M on which the two guide lugs on the top of the truck engage so as to prevent capsizing or getting off the rails. The bottom N of the trucks, which may consist of wood or of a light iron frame is provided at one end with trunnions O running in suitable bearings. On these trunnions the bottom is capable of turning by not less than 90° downwardly from the plane of the track so as to get into flush with endwall of the truck (see the dotted lines on Fig. 3).

In the loading and conveyance of the truck the bottom is held in horizontal position by means of a support iron P resting on two brackets or hooks Q which are connected with each other and constructed in the shape of two bell crank levers capable of turning on trunnions and provided at their other end with movable weights R tending to hold the hooks Q in proper position. By lifting the end of the support hooks which are connected with the weights R, the support hooks will be withdrawn from the support iron P and the bottom N will turn on its hinges and drop down in vertical position whereby the load is discharged.

At the end of the track are provided two horizontal rollers S crosswise of the direction of conveyance. When the truck is pushed forward in the direction indicated in the drawing the bottom will be swung first by one roller and then by the other upwardly to its original horizontal position as shown in dotted lines on Fig. 3. When the bottom has turned to such extent that the support iron touches the support hooks, the latter will owing to the construction be withdrawn so far as to enable the support iron to pass between the teeth of the hooks. The moment this takes place the weights R provided on the other end of the lever hooks will however cause the hooks to be pushed beneath the support iron when the bottom is fully returned to its original horizontal position. Instead of lifting the weighted end of the support hooks in the discharging operation, the bottom may be released by means of movable lugs provided on the trackway and engaging with the support hooks so as to push them aside.

I claim:

1. In ships for transportation of whale blubber and flesh the combination with the hold of the ship of a freezing compartment and trackways arranged on the deck alongside of the ship and adapted to receive trucks on which the flesh and blubber are taken through the freezing compartment and from which they may be dropped directly into the store room.

2. In ships for transportation of whale blubber and flesh the combination with the hold of the ship of a freezing compartment and trackways arranged on the deck alongside of the ship and adapted to receive trucks on which the flesh and blubber are taken through the freezing compartment and from which they may be dropped directly into the store room said freezing compartment being combined with a room into which the trucks carrying the flesh and blubber are conducted for being cooled before getting into the freezing compartment and with loading compartments provided in front of the said cooling room and in which the trucks are loaded through loading hatches arranged preferably in the main deck.

3. In ships for transportation of whale blubber and flesh the combination with the hold of the ship of a freezing compartment and trackways arranged on the deck alongside of the ship and adapted to receive trucks on which the flesh and blubber are taken through the freezing compartment and from which they may be dropped directly into the store room said tracks being provided with shifting devices arranged at either end of the tracks for the purpose of shifting the trucks from and to a track way carrying the trucks back to the loading compartment after being discharged in the store room.

4. A ship of the character described, comprising upper and lower decks, a receiving compartment formed between said decks, a cooling compartment arranged to communicate with the receiving compartment, a freezing compartment arranged to communicate with the cooling compartment, a storage compartment arranged to communicate with the freezing compartment, and means to move the material to be stored successively through the several compartments.

5. A ship of the character described, comprising two decks, a series of compartments formed between said decks, and constituting a receiving room arranged at one end of the ship, a store room at the opposite end of the ship, and communicating cooling and freezing rooms interposed between and communicating with said receiving and storage rooms.

6. A ship of the character described, comprising two decks, a series of compartments formed between said decks, and constituting a receiving room arranged at one end of the ship, a store room at the opposite end of the ship, communicating cooling and freezing rooms interposed between and communicating with said receiving and storage rooms, tracks extending through said rooms, trucks movable on said tracks, and means to lower and raise the trucks into and out of the receiving and storage rooms respectively.

7. A ship of the character described, comprising two decks, a series of compartments formed between said decks, and constituting a receiving room arranged at one end of the ship, a store room at the opposite end of the ship, communicating cooling and freezing rooms interposed between and communicating with said receiving and storage rooms, tracks on the lower deck extending through the rooms, trucks movable on said tracks, guide rails on the ceiling of the upper deck, and lugs on the tops of the trucks engaging the guide rails to prevent the trucks from tipping.

8. A ship of the character described, comprising two decks, a series of compartments formed between said decks, and constituting a receiving room arranged at one end of the ship, a store room at the opposite end of the ship, communicating cooling and freezing rooms interposed between and communicating with said receiving and storage rooms, tracks on the lower deck extending through the rooms, trucks movable on said tracks, guide rails on the ceiling of the upper deck, lugs on the tops of the trucks engaging the guide rails to prevent the trucks from tipping, and rooms above the receiving and storage rooms to receive the trucks.

In testimony that I claim the foregoing as my invention, I have signed my name in presence of two subscribing witnesses.

JENS ANDVIG.

Witnesses:
C FABRICIUS HARISEN,
M. E. GUTTORMSEY.

Copies of this patent may be obtained for five cents each, by addressing the "Commissioner of Patents, Washington, D. C."